(12) United States Patent
Tsai et al.

(10) Patent No.: US 12,492,921 B2
(45) Date of Patent: Dec. 9, 2025

(54) TOUCH SENSOR

(71) Applicant: HIGGSTEC INC., Yilan County (TW)

(72) Inventors: Hung-Yu Tsai, Yilan County (TW);
Yung-Chuan Hsu, Yilan County (TW);
Zhe-Wei Zhang, Yilan County (TW)

(73) Assignee: HIGGSTEC INC., Yilan County (TW)

( * ) Notice: Subject to any disclaimer, the term of this patent is extended or adjusted under 35 U.S.C. 154(b) by 130 days.

(21) Appl. No.: 18/613,469

(22) Filed: Mar. 22, 2024

(65) Prior Publication Data
US 2025/0297871 A1    Sep. 25, 2025

(51) Int. Cl.
*G01D 5/241* (2006.01)
*G01R 27/26* (2006.01)
*G06F 3/042* (2006.01)
*G06F 3/044* (2006.01)

(52) U.S. Cl.
CPC ....... *G01D 5/2417* (2013.01); *G01R 27/2605* (2013.01); *G06F 3/0428* (2013.01); *G06F 3/044* (2013.01); *G06F 3/0441* (2019.05); *G06F 3/0442* (2019.05); *G06F 3/0443* (2019.05); *G06F 3/0444* (2019.05); *G06F 3/0445* (2019.05); *G06F 3/0446* (2019.05); *G06F 3/0447* (2019.05); *G06F 3/0448* (2019.05)

(58) Field of Classification Search
CPC ............. G01D 5/2417; G01R 27/2605; G06F 3/0428; G06F 3/044; G06F 3/0441; G06F 3/0442; G06F 3/0443; G06F 3/0444; G06F 3/0445; G06F 3/0446; G06F 3/0447; G06F 3/0448

USPC ......................................................... 324/686
See application file for complete search history.

(56) References Cited

U.S. PATENT DOCUMENTS

| 12,314,492 B1* | 5/2025 | Tsai | G06F 3/03547 |
| 2024/0281083 A1* | 8/2024 | Terracina | G06F 3/03547 |
| 2024/0288962 A1* | 8/2024 | Sathe | G06F 3/045 |

FOREIGN PATENT DOCUMENTS

| TW | 201205404 | 2/2012 |
| TW | 202109259 | 3/2021 |

* cited by examiner

*Primary Examiner* — Raul J Rios Russo
(74) *Attorney, Agent, or Firm* — MUNCY, GEISSLER, OLDS & LOWE, P.C.

(57) ABSTRACT

A touch sensor comprises two baseplates arranged at intervals, a first electrode disposed between the baseplates, and a pressure sensing module. Two-dimensional touch control of the sensor is achieved by the first electrode. An insulating material is provided between the module and the first electrode. The module comprises a second electrode based on the insulating material and disposed on a side of the insulating material away from the first electrode, and a third electrode disposed above the other one of the baseplates. The second electrode is not in contact with the third electrode, an air gap is provided between the second and third electrodes, the second and third electrodes are respectively connected to a signal output source. When one of the baseplates close to the second electrode is touched, the air gap changes a spacing to change a self-capacitance signal of the signal output sources.

6 Claims, 3 Drawing Sheets

TOUCH SENSOR

FIELD OF THE INVENTION

The invention relates to a touch sensor, and more particularly to a touch sensor using an air gap to provide insulation.

BACKGROUND OF THE INVENTION

Taiwan patent Nos. TW 201205404A1 and TW 202109259A respectively disclose a capacitive touch sensor. The capacitive touch sensor uses changes of a capacitance signal induced between two electrodes to interpret signals sensed by the touch sensor.

In addition, the touch sensor of the previously disclosed patents has an insulator (the elastic insulator disclosed in TW 201205404A1, and the variable pressure-sensitive material disclosed in Taiwan patent No. TW 202109259A) provided between the two electrodes. Two sides of the insulator respectively contact the two electrodes, when one of the two electrodes is stressed, the insulator is pressed, changing contact areas between the insulator and the two electrodes, thereby changing a capacitance signal between the two electrodes. However, in the previously disclosed technical solution, the other one of the two electrodes may be affected by external force or the insulator, thus affecting a variation of the capacitance signal, resulting in the previously disclosed touch sensor being incapable of providing the other one of the two electrodes with better shielding effects.

SUMMARY OF THE INVENTION

A main object of the invention is to solve the problem that conventional touch sensors are incapable of providing good shielding effects for electrodes, thus affecting signal interpretation.

In order to achieve the above object, the invention provides a touch sensor comprising two baseplates arranged at intervals, a first electrode disposed between the two baseplates and provided below one of the two baseplates, and a pressure sensing module disposed between the two baseplates, the first electrode is used to realize two-dimensional touch control of the touch sensor, an insulating material is provided between the pressure sensing module and the first electrode, the pressure sensing module comprises a second electrode based on the insulating material and disposed on a side of the insulating material away from the first electrode, and a third electrode disposed above the other one of the two baseplates, the second electrode is not in contact with the third electrode, an air gap is provided between the second electrode and the third electrode, the second electrode and the third electrode are respectively connected to a signal output source, when one of the two baseplates close to the second electrode is touched, the air gap changes a spacing thereof to change a self-capacitance signal of the two signal output sources.

In one embodiment, the pressure sensing module and the first electrode are stacked on an axis.

In one embodiment, the spacing of the air gap is greater than a thickness of the insulating material.

In one embodiment, the insulating material is a polyester material.

In one embodiment, the touch sensor includes at least one adhesive glue disposed along peripheries of the two baseplates to bond the two baseplates.

In one embodiment, the first electrode, the second electrode and the third electrode are respectively composed of a conductive material and an insulating tape provided on the conductive material.

According to the foregoing disclosed summary of the invention, compared with the prior art, the invention has the following characteristics: the touch sensor of the invention uses the air gap to provide insulation between the second electrode and the third electrode, thereby when one of the two baseplates close to the second electrode is touched, a pressing weight exerted by a user can be concentrated on the second electrode, so that the third electrode is capable of obtaining a better shielding effect, thereby enabling the two signal output sources to measure signal changes more accurately.

DETAILED DESCRIPTION OF THE PREFERRED EMBODIMENTS

The detailed description and technical content of the invention are described below with reference to the accompanying drawings.

Figure 1:
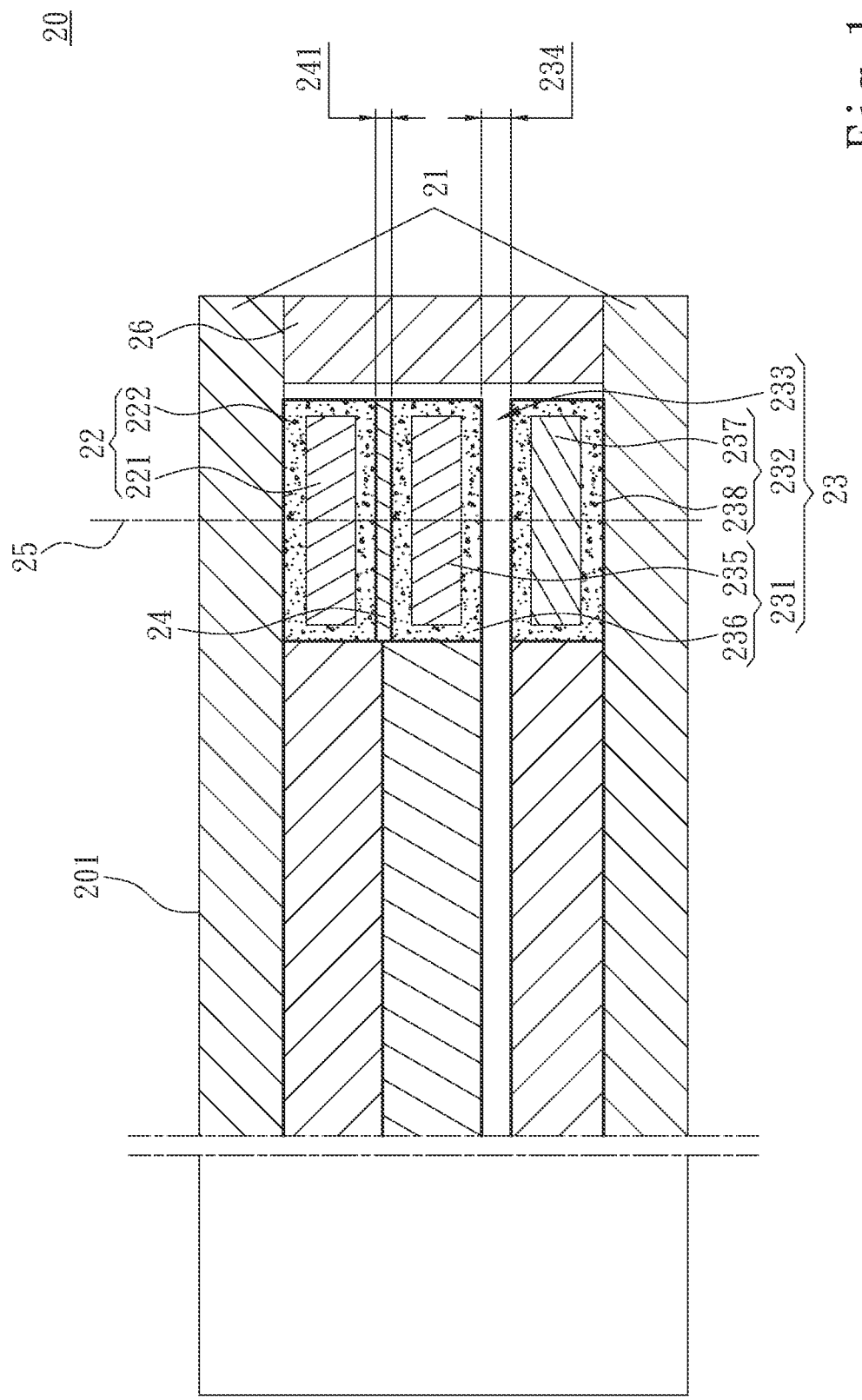
FIG. 1 is a schematic structural diagram of an embodiment of the invention.
Figure 2:
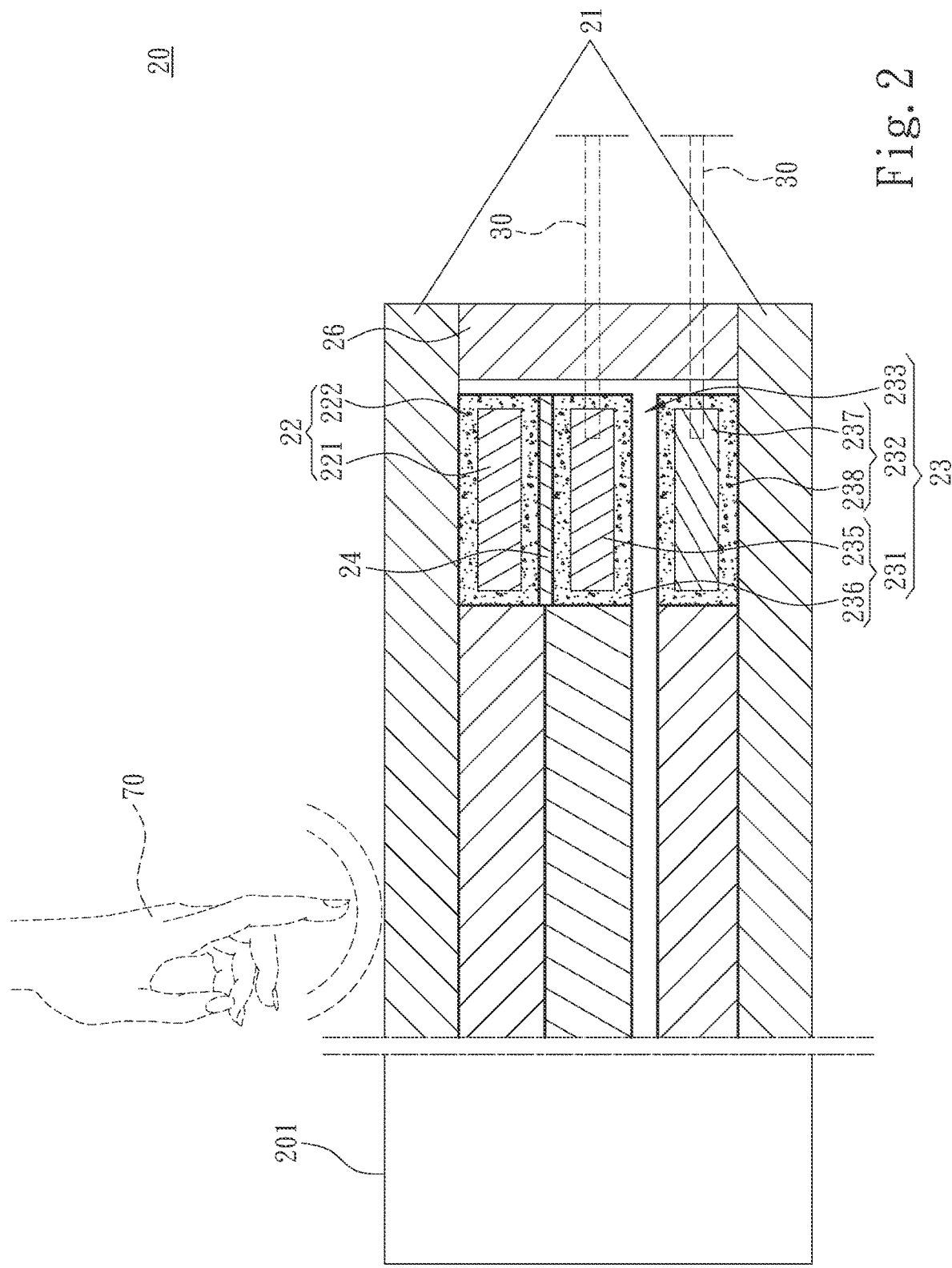
FIG. 2 is a schematic diagram of implementation of the invention.
Figure 3:
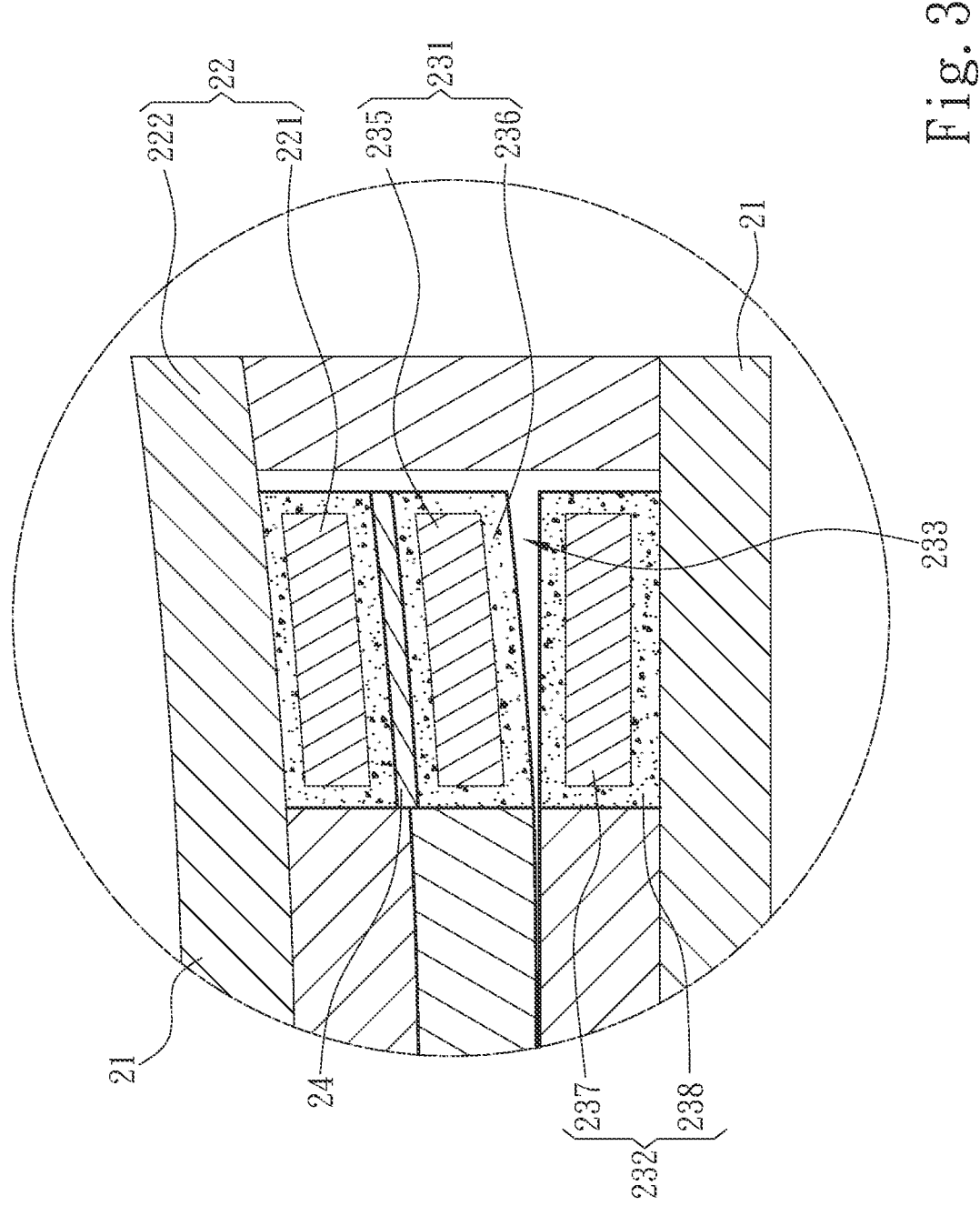
FIG. 3 is an enlarged view of partial structures of FIG. 2.

Please refer to FIG. 1, FIG. 2, and FIG. 3, the invention provides a touch sensor 20 adapted to a frame position of a touch screen, and the touch screen is provided with a structure additionally used to implement touching. The touch sensor 20 comprises two baseplates 21, a first electrode 22 and a pressure sensing module 23. The two baseplates 21 are spaced apart and protect the first electrode 22 and the pressure sensing module 23. In detail, the touch sensor 20 includes a touch surface 201, and the touch surface 201 is provided on one of the two baseplates 21 and provided for a user 70 to control by touching. In one embodiment, each of the two baseplates 21 is made of a glass material.

In addition, the first electrode 22 is disposed between the two baseplates 21 and is provided below one of the two baseplates 21. Two-dimensional touch control of the touch sensor 20 is achieved by the first electrode 22. Specifically, the first electrode 22 is distributed with a plurality of conductive patterns (not shown in the figures). The plurality of conductive patterns are located on a side of the first electrode 22 facing one of the two baseplates 21 provided with the touch surface 201. When the touch surface 201 is touched, the plurality of conductive patterns determine two-dimensional touch control of the touch sensor 20 based on an energization condition. It should be noted that the two-dimensional touch control mentioned in this specification refers to a control signal formed by the first electrode 22 based on position information formed by X and Y coordinates of a touch point. In other words, control methods of the two-dimensional touch control can be sliding, single point, etc., which can generate commands such as movement and selection by clicking.

The pressure sensing module 23 is disposed between the two baseplates 21 and is used to realize three-dimensional touch control of the touch sensor 20. The three-dimensional touch control described in this specification is also called force touch by those having ordinary skill in the art, referring to a control signal formed by the pressure sensing module 23 based on Z coordinates of a touch point. In other words, the three-dimensional touch control is formed based on a touch depth of the user 70 on the touch surface 201.

An insulating material 24 is provided between the pressure sensing module 23 and the first electrode 22. The insulating material 24 can be made of a polyester (PET) material, or can be made of other materials capable of blocking electrical conduction between the first electrode 22 and the pressure sensing module 23. The pressure sensing module 23 comprises a second electrode 231 and a third electrode 232. The second electrode 231 is disposed on a side of the insulating material 24 opposite to the first electrode 22 based on the insulating material 24. The third electrode 232 is disposed above one of the two baseplates 21 without the touch surface 201 provided. After the second electrode 231 and the third electrode 232 are assembled, the second electrode 231 is suspended above the third electrode 232 by bonding to the insulating material 24, and the second electrode 231 is not in contact with the third electrode 232. An air gap 233 is provided between the second electrode 231 and the third electrode 232 to block electrical conduction between the second electrode 231 and the third electrode 232, and provide a shielding effect to the third electrode 232 when the touch surface 201 is touched, so that a pressing weight exerted by the user 70 on the touch surface 201 can be concentrated on the second electrode 231.

Then, implementation of the touch sensor 20 will be described hereinafter. Please refer to FIG. 2 and FIG. 3. When the touch sensor 20 is implemented, the second electrode 231 and the third electrode 232 are respectively connected to a signal output source 30. Assume that the touch sensor 20 is not controlled by the user 70 initially, and the two signal output sources 30 output a self-capacitance signal. At this time, the self-capacitance signal is an initial capacitance value. When the touch sensor 20 is touched on the touch surface 201 by the user 70, the first electrode 22 will generate a corresponding two-dimensional touch control based on coordinates of a touch point of the user 70. At the same time, one of the two baseplates 21 close to the second electrode 231 will deform based on a pressing force exerted by the user 70, so that the second electrode 231 is pressed to change a spacing (as shown by reference numeral 234) of the air gap 233, and the self-capacitance signal output by the two signal output sources 30 changes from an initial capacitance value to a capacitance value after pressing. Once the touch surface 201 is no longer touched, the second electrode 231 is released from a pressed state and resets to normal, so that the spacing (as shown by reference numeral 234) of the air gap 233 is also reset, thereby the self-capacitance signal of the two signal output sources 30 is restored to an initial capacitance value again.

The touch sensor 20 of the invention provides insulation between the second electrode 231 and the third electrode 232 by the air gap 233, thereby when one of the two baseplates 21 close to the second electrode 231 is touched, a pressing weight exerted by the user 70 can be concentrated on the second electrode 231, so that the third electrode 232 can obtain a better shielding effect, and the two signal output sources 30 measuring signal changes can be more accurately.

Please refer to FIG. 1, FIG. 2, and FIG. 3 again. In one embodiment, the touch sensor 20 of the invention provides the pressure sensing module 23 and the first electrode 22 to be stacked on an axis 25 to reduce a volume of the touch sensor 20. In another embodiment of the invention, the spacing (as shown by reference numeral 234) of the air gap 233 is greater than a thickness (as shown by reference numeral 241) of the insulating material 24, so that the third electrode 232 can obtain a good shielding effect.

Furthermore, please refer to FIG. 1, FIG. 2, and FIG. 3 again. In one embodiment of the invention, the first electrode 22, the second electrode 231 and the third electrode 232 are respectively composed of a conductive material 221 (or 235 or 237) and an insulating tape 222 (or 236 or 238). The conductive material 221 (or 235 or 237) has conducting electricity. The insulating tape 222 (or 236 or 238) is disposed on a periphery of the conductive material 221 (or 235 or 237), and provides an insulation effect for the conductive material 221 (or 235 or 237), thereby preventing the first electrode 22, the second electrode 231 and the third electrode 232 from being electrically conducted incorrectly. In one embodiment, the conductive material 221 (or 235 or 237) is a copper foil.

In addition, please refer to FIG. 1, FIG. 2, and FIG. 3 again. In one embodiment, the touch sensor 20 of the invention further includes at least one adhesive glue 26 disposed between the two baseplates 21, and both sides of the at least one adhesive glue 26 have an adhesive function, and the at least one adhesive glue 26 is provided along peripheries of the two baseplates 21 to bond the two baseplates 21.

What is claimed is:

1. A touch sensor comprising:
   two baseplates, arranged at intervals;
   a first electrode, disposed between the two baseplates and provided below one of the two baseplates, and two-dimensional touch control of the touch sensor is achieved by the first electrode; and
   a pressure sensing module, disposed between the two baseplates, an insulating material provided between the pressure sensing module and the first electrode, the pressure sensing module comprising a second electrode based on the insulating material and disposed on a side of the insulating material opposite to the first electrode, and a third electrode disposed above an other one of the two baseplates, the second electrode being not in contact with the third electrode, an air gap provided between the second electrode and the third electrode, the second electrode and the third electrode respectively connected to a signal output source, when one of the two baseplates close to the second electrode being touched, the air gap changing a spacing thereof to change a self-capacitance signal of the signal output sources.

2. The touch sensor as claimed in claim 1, wherein the pressure sensing module and the first electrode are stacked on an axis.

3. The touch sensor as claimed in claim 1, wherein the spacing of the air gap is greater than a thickness of the insulating material.

4. The touch sensor as claimed in claim 3, wherein the insulating material is a polyester material.

5. The touch sensor as claimed in claim 3, wherein the touch sensor comprises at least one adhesive glue disposed along peripheries of the two baseplates to bond the two baseplates.

6. The touch sensor as claimed in claim 1, wherein the first electrode, the second electrode and the third electrode are respectively composed of a conductive material and an insulating tape provided on the conductive material.

* * * * *